United States Patent Office 3,304,197
Patented Feb. 14, 1967

3,304,197
COMPOSITION CHARACTERIZED BY UNIFORMLY DISTRIBUTED INORGANIC ADDITIVES
Frederick L. Pundsack and George P. Reimschussel, Middlesex Boro, N.J., assignors to Johns-Manville Corporation, New York, N.Y., a corporation of New York
No Drawing. Filed Dec. 9, 1959, Ser. No. 858,341
16 Claims. (Cl. 117—126)

This invention relates to a new composition of matter and to methods of preparing the same. More particularly it relates to the preparation of organophilic, inorganic hydroxides and silicates which possess surface basic groups, e.g., chrysotile asbestos, calcium silicate hydrate, which can be incorporated in an integral and compatible fashion in such organic substances as liquids, resins, rubbers, paints, vehicles and other polymer systems. These treatments improve and extend the range of applicability of asbestos in reinforced plastics and other organic media. Surface treatment of hydrated calcium silicates extends the applicability of these materials as fillers, extenders, and reinforcing agents in rubbers, resins and plastics.

The desirability of modifying the surfaces of inorganic substances to increase the compatibility of these materials in organic systems has long been evident. The use of various inorganic material as pigment, fillers, extenders and reinforcing agents in organic-based liquids, paints, plastics, rubbers and other resins compositions has increased the adaptability of the continuity of the composition. In many cases, effecting mere physical mixtures alone imparts useful and desirable changes in the properties of a composition. Nevertheless, it is frequent that discontinuity or non-uniform distribution of the inorganic material within the organic composition results in the case of a mere physical mixture, and it is desired that such non-uniformity be eliminated. The accomplishment of this elimination, with resulting uniformity, produces many new and useful properties in the composition.

As a rule, two general approaches are available to increase the compatibility and affinity of inorganic additives in organic systems. Both approaches aim at forming a chemical bond or chemisorptive bond between the inorganic and organic phases. The first method of doing this is to presurface treat the inorganic phase with an agent which chemically reacts with the surface of the inorganic material and forms a new surface. Since the previous surface is organophobic or more precisely hydrophilic, it is desirable that the surface treating material provide an organophilic property. It is further desirable that the surface treating agent be composed of di- or multifunctional molecules. At least one of the functions should be capable of reacting with the inorganic surface so as to provide firm attachment. The remaining function or functions should be available for reaction with the organic material so as to affect a coupling between the inorganic and organic phases. It is well known in the glass-fiber-surface treating art, which fibers are used to reinforce plastics, to use certain organo-silicones as effective coupling agents. See for example the U.S. Patents Nos. 2,688,006 and 2,688,007. Likewise, see U.S. Patents Nos. 2,657,149; 2,727,876; 2,728,740 to Iler. These latter patents relate to the esterification of silica-type surfaces to produce organophilic materials. These processes consist of reacting surface silanol groups (—SiOH) on the silica surface with primary and secondary alcohols. Using such unsaturated alcohols it is possible to attach the organic molecules to the silica surface and subsequently polymerize the unsaturated group into a suitable resin matrix. The reaction of the alcohols with the silanol groups is an esterification type reaction in which the silanol surface is the acid. Although a considerable amount of successful work has been done in providing effective coupling agents for various inorganic materials possessing silanol groups, these coupling agents are ineffective with other inorganic materials, e.g., asbestos, which are too basic to react in the above-mentioned treatment. The glass or silca surface is composed largely of —SiO and —SiOH groups. On the other hand, the surface of many hydrated silicates and hydroxides consists of metal cation hydroxide groups, e.g., —MgOH, —CaOH, —AlOH, etc. Such groups, being of a basic nature, do not exhibit the same reactive properties as does the acidic —SiOH group, and thus, they do not respond to the coupling agents which are so effective with glass or other silanol-bearing materials.

The second method of coupling inorganic and organic phases involves the incorporation of the coupling agent in the uncured resins per se. In this case, the organic system is modified to some extent to adapt itself to the inorganic phase. As a rule, however, it is usually easier to modify the inorganic phase by a pre-surface-treatment.

It is, therefore, a primary object of the present invention to provide a method for overcoming the difficulties alluded to above and to obtain a uniform compatible inorganic-organic composition.

It is, therefore, another object of this invention to provide compatible inorganic-organic compositions by altering the surface properties of the inorganic materials which are normally organophobic and make them organophilic.

It is, therefore, another objective of this invention to alter the surface of inorganic materials by attaching thereto reactive organo groups so that the thus attached groups may subsequently act as a coupling agent for the inorganic material and subsequently incorporated organic compositions.

It is still a further objective of this invention to improve the compatibility of inorganic and organic phases of a composition containing both by altering the surface properties of the inorganic phase to make them organophilic.

It is still a further objective of this invention to attach reactive organic molecules to the surface of inorganic materials so that the attached organic molecules may subsequently be polymerized into a suitable resin or other organic polymer, thereby conferring unusual strength and continuity to the polymer body.

As illustrative of the types of plastics and resins with which the instant coupling agents are particularly adapted to react to form improved products are any of the resinous polymers and copolymers formed mainly by additive type polymerization, that is, originally from monomers at least one of which was unsaturated. For instance, the thermosetting, non-condensing resins include the unsatured polyesters, allyl esters (for example diallyl phthalate), styrene-unsaturated polyester copolymers, thermosetting vinyl type resins, and allylic resins. The epoxy resins might also be used. However, compositions possessing di-acidic groups are also useful.

Inorganic silicates and hydroxides, e.g., chrysotile asbestos, kaolin, calcium silicate hydrates, and magnesium hydroxide, contain hydroxyl groups in their crystal lattices and in at least a portion of their terminating crystal surfaces. These surface hydroxyl groups can act as a strong base and if they are contacted with acidic groups under proper conditions they will chemically react. A simple example of this reaction is dissolution of chrysotile by aqueous solutions of acids such as hydrochloric, sulfuric and nitric acid to form silica gel. In these cases, of course, the reaction is not limited to surface hydroxyl groups but extends to hydroxyl groups throughout the entire crystal structure.

Therefore, in treating asbestos or like inorganic materials with organic coupling agents, one of the problems is to limit the reaction to the surface of the silicate. The organic material should be used as the treating agent. It has been discovered that various organic compositions possessing acidic functional groups will react only with the surface hydroxyl groups under proper conditions. These acidic groups include, among others, the carboxylic groups, phenolic groups, sulfonic groups, and acidic chloro groups.

To bring about the desired reaction between these acidic functional groups and the surface hydroxyl groups, various conditions are considered important to produce the desired result. In contacting organic molecules with inorganic material, two general approaches may be used. The first provides for the inorganic material to be contacted with a solution of the desired organic substance in a suitable solvent. The second approach calls for the inorganic material to be directly contacted with the organic compound. This allows the organic compound to be the liquid or gaseous phase. For instance, if reactions are run in an aqueous system, the inorganic surface, because of its metal cation-hydroxyl groups undergoes appreciable ionization and reaction with the acid tends to occur in solution near the solid-solution interface rather than on the surface of the solid itself. If the resulting salt is insoluble it may be precipitated on the silicate surface and form a physical bond. However, this physical bonding is not particularly adherent nor resistant to extraction with a suitable solvent. It is thus desirable to perform the reaction or chemisorption under such conditions as to minimize ionization.

This means in effect that the amount of water or similar polar material present in the solvent should be kept as low as possible, thereby holding the ionization of the surface at a minimum so that the hydroxyl groups will be maintained in situ on the surface and thus present to react with the acidic functional groups of the organic material, and form subsequently on the surface a reacted or chemisorbed compound.

This minimization of ionization can be achieved by controlling various conditions of the system. For example, if an organic acid is used to provide the acidic functional groups, the solvent must be evaluated and such a system selected in which the organic acid is soluble, but in which the metal cation-salt is insoluble. Unless the salt is insoluble in the system, there will be little or no film attachment of the organic material. Thus, the selected solvent is limited in that it must be non-polar or slightly polar so that the surface of the inorganic additive does not undergo any appreciable ionization. The extent of polarity permissible will be discussed later. Among the many useful solvents, we have found kerosene, benzene, heptane and related derivatives, saturated petroleum hydrocarbon fractions, carbon tetrachloride and other similar liquids to be suitable. Consequently the selected solvent must be a solvent for the organic compound containing acidic functional groups and not the metal-organic salt of the inorganic additive and additionally must have inconsequential polarity so as to prevent any appreciable ionization of the additive surface.

In maintaining the water content of the system relatively low it is consequently necessary that the water content of the fiber per se be reduced to a minimum. In such systems it is desirable that the "free" water content be maintained at a value less than that corresponding to the amount of water sorbed by inorganic material at 100 percent relative humidity. As a general rule, it is desirable to have an inorganic material surface relatively dry when attempting to react it with the acidic functional group. If the inorganic material contains an appreciable amount of sorbed water, it is usually advantageous to pre-dry it before adding the organic reactant. Likewise, it is useful if the reaction can be carried out at elevated temperatures since this increases the rate at which the reaction occurs. This can be accomplished by mixing the inorganic material in the relatively non-polar liquid and heating the mixture above 100° centigrade for several minutes. It is, therefore, desirable that the relatively non-polar solvent possess a boiling point in excess of 100° C. The acid acting organic material then can be added to the hot mixture and the reaction completed by holding the system at 100° C. By holding the reaction temperature above 100° C. any water formed by the reaction in the system will be removed, thereby helping to drive the reaction to completion. Likewise, the removal of water prevents the accumulation of water in the system and subsequent poisoning of the reaction. When the reaction is completed the mixture is filtered, washed with a low boiling hydrocarbon solvent if desired, the solvent recovered and the solid dried. Other means of removing any water formed from the field of the reaction can be employed, such as dehydrating agents, heat, vacuum, etc., depending on the nature of the reaction.

Another method of accomplishing the purpose of this invention is slurrying the inorganic material with a solution of the acid acting organic material in a relatively low boiling non-polar solution. Of course, any sorbed water of the fiber should be removed by a pre-drying step. Low boiling petroleum hydrocarbon fractions, such as petroleum ether, are suitable for this purpose. The low-boiling solvent may be removed by heating or by an air stream and recovered. The removal of the solvent leaves the inorganic sulface covered with the acid-acting organic material and by heating the thus covered material above 100°, the reaction of the surface with the acidic functional groups may be completed under substantially anhydrous conditions, since the water formed by the reaction will be removed immediately.

Still another method of carrying out the reaction of the inorganic surface hydroxyl groups with the acid acting material can be used where such organic material is essentially water insoluble and has no appreciable reaction with the inorganic surface below 100° C. In these cases, the acid acting material may be sorbed on the surface of the inorganic substance from aqueous emulsions and after filtering off the liquid, the acidic functional groups can be caused to react with the surface of the inorganic substance by heating the material with the sorbed acid acting composition to a temperature in excess of 100° C.

A still further method of accomplishing the purpose of the invention is by treating the selected inorganic additive with a suitable organic composition containing acidic functional groups in a gaseous state under such conditions of temperature and pressure that any water formed in the reaction is vaporized and removed immediately. In certain cases the vapor phase treatments may prove more practical than a treatment using a liquid solution of the organic compound. In vapor phase treatments it may be possible to achieve more complete contact of the reactants; the temperature is not necessarily limited by the presence of a low boiling solvent; water formed in the course of the reaction may be swept out; and additional filtration and drying steps necessary in a liquid phase treatment can be eliminated.

Examples of reactions carried out as described in this invention are as follows:

*Example 1*

Ten grams of "Micro-Cel A" (a Johns-Manville synthetic calcium silicate hydrate composition) is mixed with 500 ml. of a petroleum hydrocarbon fraction boiling at 165–180° C. The mixture is heated to a reflux and then 2.2 ml. of oleic acid are added (20% oleic acid by weight of "Micro-Cel A") and the refluxing is continued for thirty minutes. The mixture is filtered and the filter cake is washed thoroughly with benzene and then dried at 130° C. The free-flowing, powdery product is not wet readily by water but is wet readily by organic liquids such as benzene, kerosene, heptane and xylene. It gives good suspensions in these liquids whereas the untreated material flocculates and settles out of these liquids immediately. The treated product retains its organophilic properties even after prolonged extraction with benzene. Treatment of "Micro-Cel A" with as little as 5% oleic acid is beneficial in improving its organophilic properties, but the preferred treatment is in the range of 10–20% oleic acid.

*Example 2*

Ten grams of "Micro-Cel A," a Johns-Manville commercially available calcium silicate hydrate composition, is slurried into 90 ml. of benzene containing 1.1 ml. of oleic acid (10% oleic acid by weight of "Micro-Cel A"). After thorough mixing the thin slurry is poured into a shallow dish and air-dried to form a wet cake of the solid material. This wet cake is dried at 130° C. The powdered product is wet readily by organic liquids such as kerosene, xylene and benzene and it gives good suspensions in these liquids.

*Example 3*

Fifteen grams of a calcium silicate hydrate preparation prepared by reacting 64 g. of slaked lime, 39 g. of "Celite 392" (a Johns-Manville diatomaceous earth product), and 3 liters of water for 4 hours at 262° C. were brought to a reflux in 400 ml. of a petroleum hydrocarbon fraction boiling at 165–180° C. One hundred ml. of the hydrocarbon liquid containing 15 g. of benzoic acid in solution was added to the refluxing mixture. Water vapor was ejected from the mixture rather violently when the benzoic acid solution was added. After refluxing for one hour the mixture was filtered, and the filter cake was washed thoroughly with benzene and then dried at 130° C. The free-flowing powdery product, which could be wet by water, gave good suspensions which settled slowly in heptane, xylene, and kerosene. The untreated product flocculated and settled out immediately in these latter liquids.

*Example 4*

Five grams of clean chrysotile asbestos was placed in a vacuum chamber and outgassed for 2 hours at 150° C. to remove sorbed water. While a vacuum of about 2 mm. of mercury pressure was maintained, phenol in the vapor state was bled for 2 hours through the vacuum chamber containing the fiber. Then the sample was outgassed for another 30 minutes to remove any excess unreacted phenol. The product could be wet by water and gave a slightly lower pH than did a similar suspension of the untreated fiber. When the treated fiber was suspended in ethyl alcohol it gave a suspension four times as turbid as a similar suspension of the untreated fiber. The treated fiber retained its enhanced organophilic properties even after prolonged extraction with benzene.

*Example 5*

Ten grams of clean chrysotile asbestos fiber was refluxed in 500 ml. of a petroleum hydrocarbon fraction boiling at 165–180° C. Twenty-five percent by weight oleic acid was added to the mixture and the system refluxed for 1 hour. The mixture was filtered, and the fiber was washed thoroughly with benzene to remove any occluded oleic acid. The washed fiber was dried at 130°, and then opened by treating dry in a Waring Blendor. The treated fiber was not wet readily by water, but it was wet by heptane, benzene, xylene, and kerosene. It gave much better dispersions in these latter materials than did the untreated material. The fact that the organic molecules associated with the fiber still contain reactive unsaturated groups can be demonstrated by the addition of iodine or bromine to the unsaturated bonds in the organic molecules.

Eleven organic acids representing six different types of acids were evaluated with varying degrees of thoroughness as treating agents for asbestos. They are listed in Table I:

TABLE I.—ORGANIC ACIDS EVALUATED AS TREATING AGENTS FOR ASBESTOS

| Class of Acid | Name | Formula |
| --- | --- | --- |
| Fatty Acids | Palmitic | $CH_3(CH_2)_{14}COOH$ |
|  | Stearic | $CH_3(CH_2)_{16}COOH$ |
|  | Oleic | $CH_3(CH_2)_7CH=CH(CH_2)_7COOH$ |
|  | Linoleic | $CH_3(CH_2)_4CH=CHCH_2CH=CH(CH_2)_7COOH$ |
| α, β Unsaturated Acids | Acrylic | $CH_2=CHCOOH$ |
|  | Crotonic | $CH_3CH=CHCOOH$ |
| Di-unsaturated Acids | Sorbic | $CH_3CH=CHCH=CHCOOH$ |
| Dibasic Acids | Adipic | $HOOC(CH_2)_4COOH$ |
| Dibasic Unsaturated Acids | Maleic | $HOOCCH=CHCOOH$ |
| Aromatic-type Acids | Benzoic | 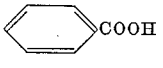 COOH |
|  | Phenylacetic | 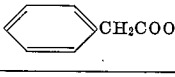 $CH_2COOH$ |

It had been found that an unsaturated fatty acid such as oleic acid is chemisorbed from benzene or similar solvents by chrysotile asbestos and various hydrated calcium silicates. The amount chemisorbed is affected by the presence of sorbed water on the asbestos or hydrate. This is illustrated by the data of Table II which shows the decrease in the amount of oleic acid sorbed per gram of fiber as the amount of water on the surface increases.

TABLE II.—CHEMISORPTION OF OLEIC ACID FROM BENZENE BY CHRYSOTILE [1]

|  | Fiber conditioned at— | | |
| --- | --- | --- | --- |
|  | 185° C. | 29% RH | 100% RH |
| Mg. acid sorbed/g. fiber | 10.8 | 7.4 | ~0.5 |

[1] Equilibrium conc. of oleic acid was 0.11 moles/kilogram of benzene.

Ten gram samples were conditioned 48 hours as indicated, and then the samples were contacted with 100 ml. of the oleic acid benzene solution. Equilibrium was established very rapidly, probably within seconds. A series of experiments were also run to establish the relationship between oleic acid concentration and the amount of acid sorbed. It was established that above an equilibrium concentration of about 0.005 moles of oleic acid/kg.

benzene the amount of acid chemisorbed by the fiber is constant and has a value of approximately 1% by weight of the fiber. This latter value might be expected to vary with the exposed surface area of the particular fiber being treated. The acid which is chemisorbed resists extraction with hot benzene. Experiments have shown that even after more than fifteen extractions with benzene 80% or more of the original chemisorbed oleic acid remains fixed to the fiber surface.

Fiber which contains chemisorbed oleic acid is somewhat hydrophobic and markedly organophilic. For example, the treated fiber floats without wetting when placed on the surface of water, but it wets readily in the usual organic liquids (e.g., alcohols, benzene, kerosene, carbon tetrachloride). The hydrophobic character of the fiber is of a limited nature, however, since the fiber can be wet by stirring it vigorously into water. The treated fiber has to check the sorption data obtained with the methods described above, direct determinations of the organic content of the fibers was made from time to time. These direct determinations consist of igniting the fiber at 1000° C. after first washing it with benzene or methyl ethyl ketone to remove any occluded organic material and then drying at 130° C. The organic content was calculated from the loss on ignition over and above that normally found for the fiber. As a rule, the organic contents determined from ignition data were slightly lower than the values determined from differences in concentration of the acid solutions, but both sets of values were of the same magnitude. The difference seems reasonable since the washing of the fiber to remove occluded organic material prior to the ignition run will also tend to remove some of the chemisorbed organic material. The data from these adsorption runs are summarized in Table III.

TABLE III.—SUMMARY OF BEHAVIOR OF ORGANIC ACIDS WITH DRY ASBESTOS

| Acid | Solvent | Reaction | Comments[1] |
|------|---------|----------|-------------|
| Palmitic | Kerosene | Chemisorption | Limit of sorption, ~1.0%. |
|  | Benzene | do | Limit of sorption, ~1.1%. |
| Stearic | do | do | Do. |
|  | MEK | do | Limit of sorption, ~0.9%. |
| Oleic | Benzene | do | Limit of sorption, ~1.1%. |
|  | MEK | do | Limit of sorption, ~1%. |
| Linoleic | Benzene | do | Do. |
| Benzoic | MEK | do | Limit of sorption, ~0.9%. |
| Phenylacetic | Benzene | do | Data incomplete. |
| Acrylic | do | Slow reaction with bulk fiber. | Wide scatter in experimental data. |
| Crotonic | Petroleum ether | do | Do. |
| Sorbic | Benzene | Chemisorption | Limit of sorption, ~1.3%. |
| Maleic | MEK | Slow reaction with bulk fiber. | Progressive reaction with increasing acid concentration. |
| Adipic | MEK | Chemisorption | Limit of sorption, ~0.8%. |
| Maleic anhydride | MEK | do | Limit of sorption, ~0.5%. |

[1] The limit of sorption values depends on the surface area of the fiber sample used in the run. Unfortunately it was not possible to use the same fiber sample for all the runs, so the limit of sorption values is not directly comparable in all cases. The values do give an idea of the quantity of organic acid taken up by average fiber, however.

a slightly improved electrical resistance value, but the improvement is too low to be of any practical value.

The saturated fatty acids palmitic and stearic chemisorb on chrysotile asbestos in much the same way as does oleic acid. Fibers treated with palmitic and stearic acid exhibit the same hydrophobic-organophilic properties as does fiber treated with oleic acid. Saturated and unsaturated fatty acids in general exhibit the phenomenon of chemisorption by silicate surfaces bearing basic hydroxyl groups.

To determine the effectiveness of the treating agent, a study was made of the chemisorption of the organic acid by the chrysotile asbestos. These studies were carried out in general by contacting chrysotile asbestos samples with organic solvent solutions of varying concentrations of the different acids. The amount of acid that was sorbed or reacted with the fiber was determined as the difference in concentration of acid in a blank solution and in the solution in contact with the fiber. The solvents usually employed were benzene, and methyl ethyl ketone. Benzene has dielectric constant of 2.3 and is an example of a non-polar solvent and methyl ethyl ketone has a dielectric constant of 18.4 and is an illustration of a slightly polar solvent. The asbestos samples used were regular and air-cleaned chrysotile asbestos. The concentration range of the acids was from about 0.01 molal to about 2.0 molal. For those cases in which chemisorption occurred, concentrations of acid up to 0.2 molal were sufficient to establish the adsorption isotherms. Experimental determinations of the concentration of the fatty acids were made by carefully evaporating off the solvent from an aliquot and then directly weighing the fatty acid residue. The concentrations of the other acids were determined satisfactorily by mixing aliquot portions of the organic solutions with water and titrating with sodium hydroxide to a phenolphthalein endpoint. In order In general it can be said that organic compositions possessing acidic functional groups dissolved in non-polar or slightly polar solvents, such as benzene and methyl ethyl ketone, exhibit a strong tendency either to chemisorb or to slowly react with an inorganic additive. Long-chain aliphatic acids, such as stearic acid, oleic acid, and palmitic acid are chemisorbed by dry fiber. Aromatic-type acids, such as benzoic acid and related compounds also are chemisorbed as are dibasic aliphatic acids, such as adipic acid. Although the unsaturated 6-carbon chain sorbic acid appears to be chemisorbed by chrysotile, the related shorter carbon chain acrylic and crotonic acids show some evidence of slow reaction with the dry inorganic additive even in non-polar solvents. In the case of a maleic acid, the experimental data show that the acid reacts with the bulk fiber.

If the inorganic fiber contains adsorbed water, the interaction of an organic acid in benzene or MEK solutions differs markedly from that shown with the dry fiber. The long chain aliphatic acids, e.g., stearic, oleic, when dissolved in non-polar or slightly polar solvents, show little or no tendency to sorb on fibers containing adsorbed water. On the other hand, with fibers containing adsorbed water, acids, such as adipic, benzoic or sorbic, which all have some slight affinity for water, undergo a reaction with the bulk fiber structure instead of the chemisorbing as they do on dry fibers.

The best generalization concerning the interaction of inorganic acids in non-polar or slightly polar solvents, i.e., dielectric constant of the solvent less than 20, with chrysotile asbestos is as follows: If the chrysotile asbestos fiber is dry, organic acids with an acid ionization constant on the order $10^{-5}$ shows chemisorbed behavior. On the other hand, if acid ionization constant is as high as $10^{-2}$ the acid exhibits a reaction with the bulk fiber structure even in slightly polar solvents. If the fiber contains sorbed water and the acid has an affinity for the water, a reaction in the bulk fiber structure will occur even for acids with a $K_a$ of $10^{-5}$. Crotonic and acrylic acids may be exceptions to this generalization since they seem to show a very slow reaction with a dry fiber even though the acid ionization constants for these acids are $2 \times 10^{-5}$ and $5.5 \times 10^{-5}$, respectively. The best chemisorbed organic layer formed which will result in the best organophilic properties is produced by treating the inorganic fiber with a long carbon chain aliphatic acid. As the chain grows shorter, there is a tendency for the chemisorbed layer to show an affinity for water.

It is to be understood that in accordance with the provisions of the patent statute, variations and modifications of the invention, as illustrated by specific examples herein, may be made without departing from the spirit of the invention. It is to be understood that the invention is not limited to the specific embodiments thereof except as defined in the appended claims.

What we claim is:

1. The process of forming an organophilic product with an inorganic composition compressing a substrate having basic surface metal cation hydroxyl groups comprising treating the basic surface metal cation hydroxyl groups, of the inorganic composition with an organic composition having acidic functional groups in a substantially water-free medium and reacting the said basic surface metal cation hydroxyl groups of the inorganic composition with the acidic functional groups of the organic composition forming a chemical bond therebetween.

2. The process of claim 1 wherein the inorganic phase comprising the substrate having basic surface metal hydroxyl groups comprises at least one inorganic material selected from the group consisting of chrysotile asbestos and calcium silicate hydrates.

3. The process of claim 1 wherein the inorganic composition has basic surface metal cation hydroxide groups of at least one metal cation hydroxide selected from the group consisting of —MgOH and —CaOH.

4. The process of claim 3 wherein the substantially water-free medium comprises an organic solvent having a polarity which substantially prevents ionization of the surface metal cation hydroxide groups.

5. The process of forming organophilic inorganic material comprising dispersing a normally organophobic inorganic composition comprising a substrate having basic surface metal cation hydroxyl groups in a solution of an organic composition having acidic functional groups and organic solvent selected from the group consisting of non-polar solvents and slightly polar solvents and mixtures thereof, and thereby effecting a chemical bond between the basic surface metal cation hydroxyl groups of the normally organophobic inorganic composition and the acidic functional groups of the organic composition, then filtering the mixture to remove the resulting organophilic inorganic material.

6. The process of claim 5 wherein the inorganic material is asbestos.

7. The process of claim 6 wherein the solvent is kerosene.

8. The process of claim 7 wherein the acidic functional group consists of at least one member selected from the group consisting of carboxylic, phenolic, sulfonic acid, and acidic chloro.

9. The process of claim 8 wherein the acidic functional group is a long chain carboxylic acid.

10. The process of unifying polymerizable organic compositions comprising incorporating therein organophilic additives, said organophilic additives consisting essentially of the product of reacting basic surface metal cation hydroxyl groups of an inorganic material comprising an internal substrate structure with acidic functional groups of an organic coupling agent and forming a chemical bond therebetween.

11. The process of unifying polymerizable organic compositions containing an inorganic phase comprising an internal substrate structure and an organic phase comprising providing an inorganic phase having basic surface metal cation hydroxyl groups and providing an organic material containing acidic functional groups and reacting the basic surface metal cation groups of the inorganic phase with the acidic functional groups of the organic material under substantially non-ionizing conditions forming a chemical bond between the inorganic phase and the organic material.

12. The process of unifying polymerizable organic compositions containing an inorganic phase comprising an internal substrate structure and an organic phase comprising providing an inorganic phase having basic surface metal cation hydroxyl groups and providing multi-functional organic material containing at least one acidic functional group and reacting the basic surface metal cation hydroxyl groups of the inorganic phase with the acidic functional group of the multi-functional organic material under substantially non-ionizing conditions forming a chemical bond between the inorganic phase and the multi-functional organic material and, in turn, reacting the remaining groups of the multi-functional organic material with the organic phase and thereby chemically coupling the inorganic phase with the organic phase.

13. A composition of matter comprising a substrate of an inorganic phase having basic surface metal cation hydroxyl functional groups chemically bonded to an organic phase, said inorganic and organic phases being chemically bonded through a multi-functional coupling agent containing at least one acidic functional group with the chemical bond being effected between the basic surface metal cation hydroxyl functional groups of the inorganic substrate phase and the acidic functional group of the multi-functional organic coupling agent.

14. The organophilic composition of matter of claim 13 wherein the inorganic phase comprising the internal substrate structure having basic surface metal cation hydroxyl groups comprises at least one inorganic material selected from the group consisting of chrysotile asbestos and calcium silicate hydrates.

15. The composition of matter of claim 13 wherein the organic phase is united with the inorganic phase through a chemical bond formed with the remaining functional group of the multi-functional coupling agent other than the said acidic functional group.

16. A composition of matter comprising an organophilic solid composed of an inorganic phase comprising an internal substrate structure having basic surface metal cation hydroxyl groups and multi-functional molecules having at least one acidic functional organic acid group chemically bonded to the basic surface metal cation hydroxyl groups of the inorganic phase, said multi-functional molecules being polymerized into a polymer and thereby conferring high strength and continuity to the polymerized body.

References Cited by the Examiner

UNITED STATES PATENTS

| | | | |
|---|---|---|---|
| 1,094,505 | 4/1914 | Whitney | 117—126 |
| 1,967,062 | 7/1934 | Novak | 117—126 |
| 2,003,335 | 6/1935 | Black | 117—126 |
| 2,068,219 | 1/1937 | Badollet | 117—126 X |
| 2,323,387 | 7/1943 | Edelstein | 117—169 X |
| 2,407,581 | 9/1946 | Smith et al. | 117—160 |
| 2,486,720 | 11/1949 | Perkerson | 117—118 X |
| 2,504,920 | 4/1950 | Buckman et al. | 117—126 |
| 2,589,705 | 3/1952 | Kistler | 117—100 X |
| 2,601,235 | 6/1952 | Alexander et al. | |

(Other references on following page)

UNITED STATES PATENTS

| | | | |
|---|---|---|---|
| 2,668,151 | 2/1954 | Pedlow et al. | 117—100 X |
| 2,705,206 | 3/1955 | Wagner | 117—100 |
| 2,757,098 | 7/1956 | Berry et al. | 117—100 X |
| 2,796,362 | 6/1957 | Wooding et al. | 117—126 X |
| 2,801,185 | 7/1957 | Iler | 117—100 X |
| 2,955,958 | 10/1960 | Brown | 117—113 |
| 3,013,901 | 12/1961 | Bugosh | 117—72 |
| 3,013,915 | 12/1961 | Morgan | 117—126 X |

RALPH S. KENDALL, *Primary Examiner.*

RICHARD D. NEVIUS, ALFRED LEAVITT,
*Examiners.*

R. E. HOWARD, A. GOLIAN, *Assistant Examiners.*